(12) United States Patent
Zelikov et al.

(10) Patent No.: US 6,702,711 B2
(45) Date of Patent: Mar. 9, 2004

(54) AUTOMATIC TRANSMISSION PLANETARY CARRIER THRUST WASHER SYSTEM

(75) Inventors: Alexander Zelikov, Waterford, MI (US); Richard G Whalen, Macomb, MI (US); Mark G Halvorsen, Zionsville, IN (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/210,470

(22) Filed: Aug. 1, 2002

(65) Prior Publication Data

US 2004/0023749 A1 Feb. 5, 2004

(51) Int. Cl.[7] .................................... F16H 57/08
(52) U.S. Cl. ...................................... 475/331
(58) Field of Search .................... 475/331, 338, 475/159; 384/420

(56) References Cited

U.S. PATENT DOCUMENTS

| | | | |
|---|---|---|---|
| 3,631,744 A | 1/1972 | Blomquist et al. | |
| 4,289,048 A | 9/1981 | Mikel et al. | |
| 5,302,160 A | 4/1994 | Fujioka | |
| 5,368,528 A | 11/1994 | Farrell | |
| 5,470,286 A | * 11/1995 | Fan | 475/331 |
| 5,545,104 A | 8/1996 | Tilley | |
| 5,593,362 A | 1/1997 | Mizuta | |
| 5,658,215 A | * 8/1997 | Premiski et al. | 475/331 |

OTHER PUBLICATIONS

Kalpakjian, S. Manufacturing Engineering and Technology, 3rd ed. N.Y., Addison Wesley 1995. pp. 817–819.*

* cited by examiner

Primary Examiner—Ankur Parekh
(74) Attorney, Agent, or Firm—Thomas A. Jurecko

(57) ABSTRACT

A carrier assembly for an automatic transmission comprises a cup and a plate connected to the cup. The cup has a first outside diameter, and the plate has a second outside diameter greater than the first outside diameter. The plate also has a channel extending inwardly from a circumference of the plate. A thrust washer having a tab is keyed into the channel.

14 Claims, 4 Drawing Sheets

AUTOMATIC TRANSMISSION PLANETARY CARRIER THRUST WASHER SYSTEM

TECHNICAL FIELD OF THE INVENTION

This invention relates generally to transmissions for motor vehicles, and relates more particularly to a planetary gear carrier thrust washer system for an automatic transmission.

BACKGROUND OF THE INVENTION

Motor vehicles generally require a power plant such as an internal combustion engine, a power train and wheels. The internal combustion engine produces force by the conversion of the chemical energy in a liquid fuel into the mechanical energy of motion (kinetic energy), and the power train transmits this resultant force to the wheels to provide movement of the vehicle. The main component of the power train is typically referred to as the transmission. Engine torque and speed are converted in the transmission and delivered to the driven wheels in accordance with the vehicle's tractive-power availability. The vehicle's transmission is also capable of controlling the direction of rotation being applied to the wheels, so that the vehicle may be driven both forward and backward.

Transmissions are generally referred to as manually actuated or automatic transmissions. Manual transmissions generally include driver controlled and actuated mechanisms for coupling rotating gears to produce different ratio outputs to the drive wheels. Automatic transmissions are designed to take automatic control of the frictional units, gear ratio selection and gear shifting. A thorough description of general automatic transmission design principals may be found in "Fundamental Of Automatic Transmission and Transaxles," Chrysler Corporation Training Manual No. TM-508A. Additional descriptions of automatic transmissions may be found in U.S. Pat. No. 3,631,744 and U.S. Pat. No. 4,289,048. Each of these patents is hereby incorporated by reference.

A conventional automatic transmission includes a hydrodynamic torque converter to transfer engine torque from the engine crankshaft to a rotatable input member of the transmission through fluid-flow forces. The transmission also includes frictional units which couple the rotating input member to one or more members of a planetary gearset. Other frictional units, typically referred to as brakes, hold members of the planetary gearset stationary during the flow of power. These frictional units are usually brake clutch assemblies or band brakes. The drive clutch assemblies can couple the rotating input member of the transmission to the desired elements of the planetary gearsets, while the brakes hold elements of these gearsets stationary. Such transmission systems also typically provide for one or more planetary gearsets in order to provide various ratios of torque and to ensure that the available torque and the respective tractive power demand are matched to each other.

The planetary gearsets may be provided with thrust washers. These thrust washers must be manually assembled during production, and are generally direction sensitive for proper function and may be sensitive to dimensional tolerances.

SUMMARY OF THE INVENTION

The present invention is a carrier assembly for an automatic transmission. The carrier assembly comprises a cup and a plate connected to the cup. The cup has a first outside diameter, and the plate has a second outside diameter greater than the first outside diameter. The plate also has a channel extending inwardly from a circumference of the plate. A thrust washer having a tab is keyed into the channel.

Accordingly, it is an object of the present invention to provide an automatic transmission planetary carrier pinion gear thrust washer designed for reliable positioning, and having a positive anti-rotation feature lending itself to simple automated assembly at high volume production.

Another object of the present invention is to provide a carrier assembly of the type described above that may be automatically assembled.

Another object of the present invention is to provide a carrier assembly of the type described above that is relatively insensitive to dimensional tolerances.

These and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
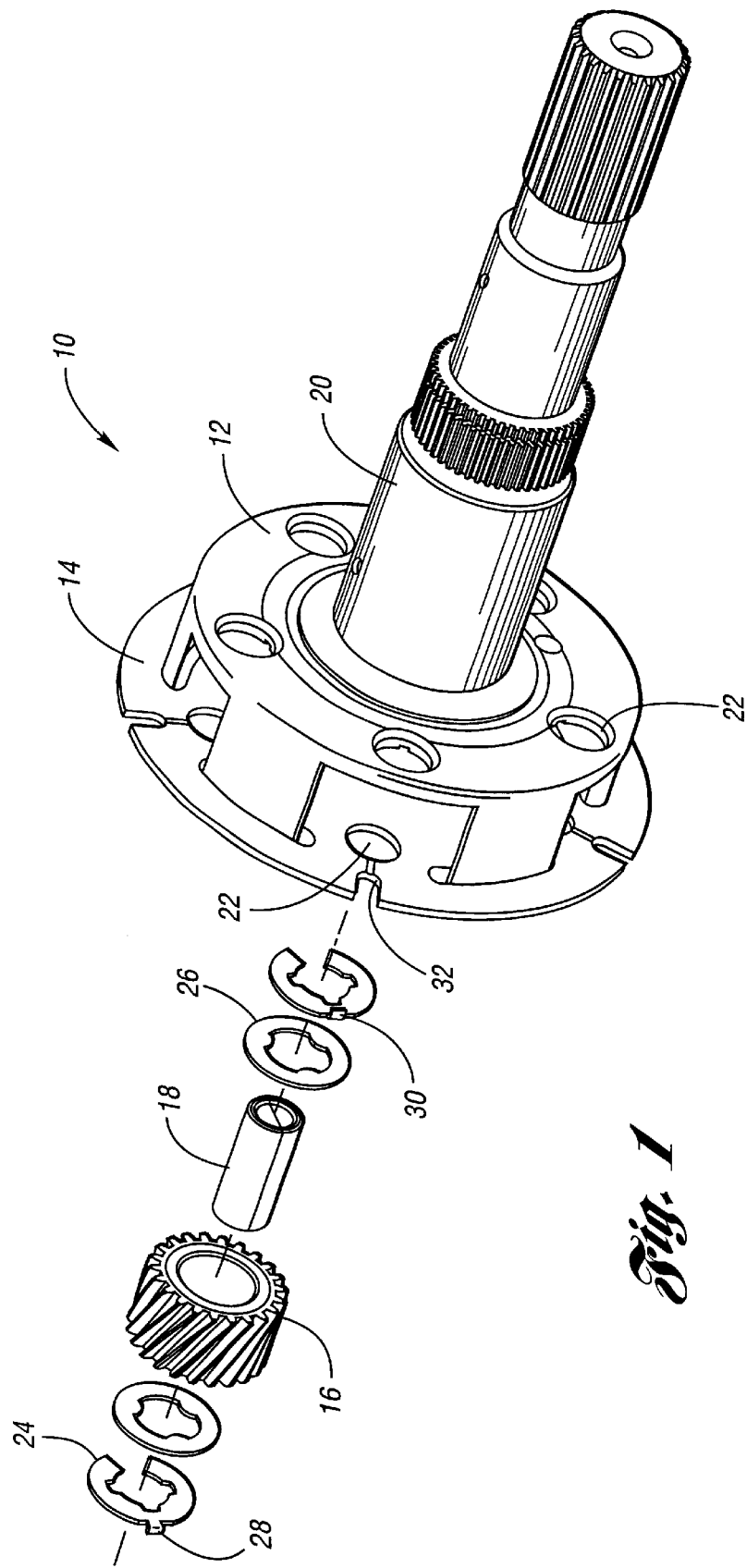
FIG. 1 is an exploded perspective view of an input carrier assembly according to the present invention.

FIG. 1 shows one embodiment 10 of a carrier assembly according to the present invention for an automatic transmission of a motor vehicle. The carrier assembly 10 includes a carrier cup 12 connected, preferably by welding, to a carrier plate 14 axially spaced from the cup. The carrier assembly 10 also includes a plurality of circumferentially spaced planetary gears 16 mounted about needle-bearinged shafts 18 extending between the cup 12 and the plate 14. An input shaft 20 is welded to the carrier cup 12, and extends from there in well known fashion. As is also well known, an annulus gear (not shown) is drivingly engaged, such as by welding, with the circumference of the carrier plate 14.

In a preferred embodiment, a gear shaft 18 is held in each of four sets of holes 22 through the carrier cup 12 and through the carrier plate 14. Thrust washers 24 and 26 are disposed on either side of each planetary gear 16. The thrust washers 24, which engage the larger outside diameter carrier plate 14, include at least one downturned anti-rotation tab 28 proximate their circumference. The thrust washers 26, which engage the relatively smaller outside diameter carrier cup 12, similarly include at least one downturned anti-rotation tab 30 along their circumference. The tab 28 of each thrust washer 24 keys into a slot 32 that extends radially inwardly from the circumference of the carrier plate 14, preferably to a radial distance that generally matches the outside diameter of the carrier cup 12. The tab 30 of each thrust washer 26 is similarly adapted to be positioned into a pocket or scallop (not shown) formed in the outside diameter of the carrier cup 12, but may more preferably be situated against the outside diameter of the carrier cup.

Figure 4:
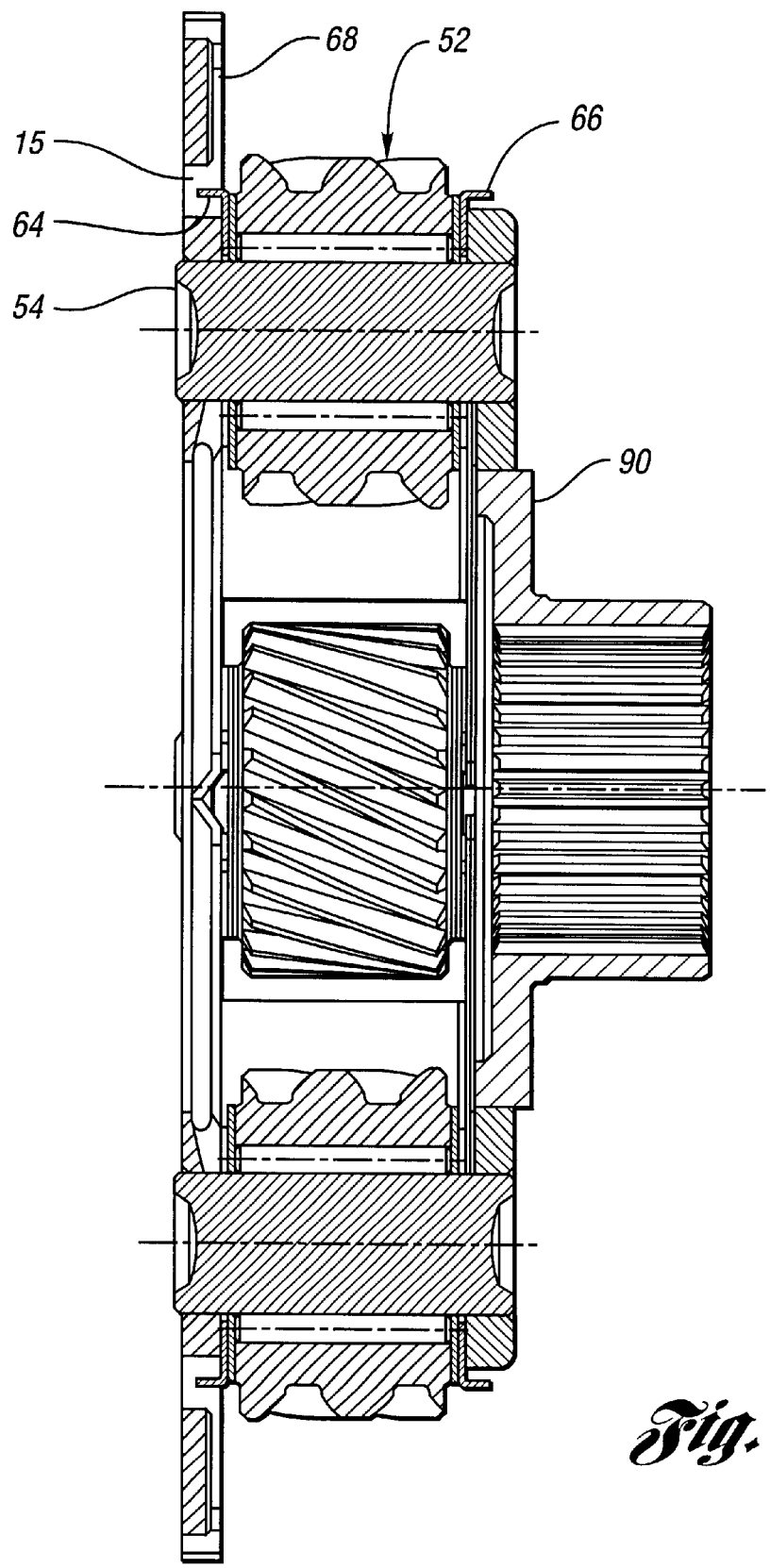
FIG. 4 is a cross-sectional view of an alternative embodiment of the reverse carrier assembly.

During assembly, the planetary gears 16 and their associated thrust washers may be inserted in an automated operation as a subassembly into position between the carrier cup 12 and the carrier plate 14. The positioning of the washer tab 28 in the slot 32 on the plate side allows the thrust washers 24 and 26 for the opposite sides of the planetary gears to be identical. While the slot 32 as shown extends all the way through the thickness of the carrier plate 14, it should be appreciated that a groove or channel similar to the optional pocket in the carrier cup 12 can be formed in the carrier plate instead of a slot. An optional hole extending entirely through the carrier plate 14, similar to a hole 15 formed in an alternative embodiment 90 of the reverse carrier assembly shown in FIG. 4, may be formed in the end of the groove to also allow automatic assembly of the tabbed thrust washers 24. Such a through hole at the end of the shallower channel permits a greater thickness of material to be preserved under the channel for additional strength of the carrier plate 14 in the loaded direction, while still giving proper clearance for the anti-rotational tabs.

Figure 2:
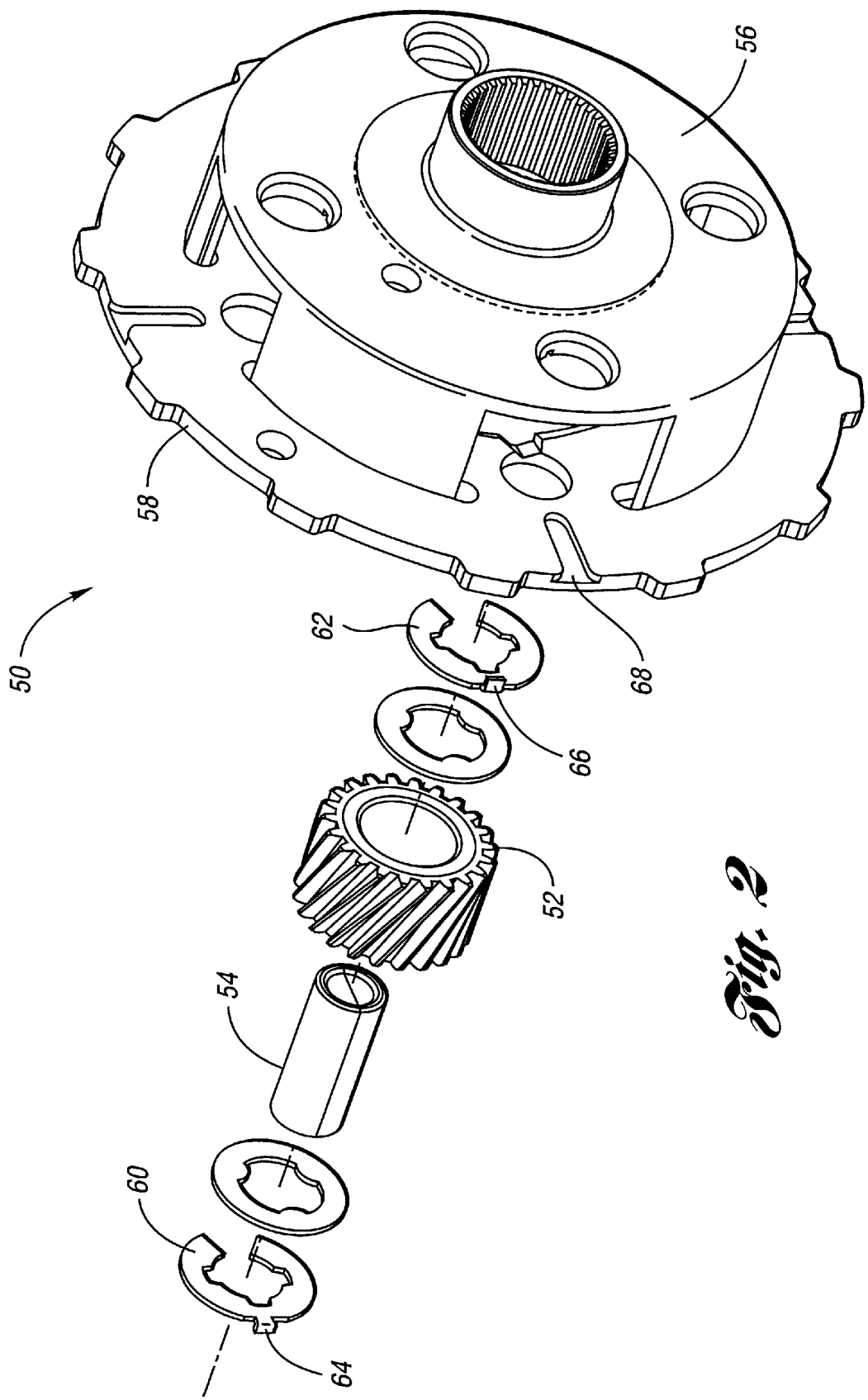
FIG. 2 is an exploded perspective view of a reverse carrier assembly.

FIG. 2 shows a reverse carrier assembly 50 for the transmission. The reverse carrier assembly 50 includes a plurality of circumferentially spaced planetary gears 52 mounted about needle-bearinged shafts 54 extending between a reverse carrier cup 56 and an externally-driven reverse carrier plate 58. Thrust washers 60 and 62 are disposed on either side of each planetary gear 52. The thrust washers 60 engage the larger outside diameter reverse carrier plate 58, and include at least one downturned anti-rotation tab 64 proximate their circumference. The thrust washers 62 engage the relatively smaller outside diameter reverse carrier cup 56, and similarly include at least one downturned anti-rotation tab 66 along their circumference. The tab 64 of each thrust washer 60 keys into a channel 68 that extends radially inwardly from the circumference of the reverse carrier plate 58, preferably to a depth that generally matches the outside diameter of the reverse carrier cup 56. The inlet to the channels 68 is preferably rounded, but may be tapered, to facilitate the automated installation of the thrust washers 60. The tab 66 of each thrust washer 62 is adapted to be positioned into a pocket or scallop (not shown) formed in the outside diameter of the reverse carrier cup 56, but may more preferably be situated against the outside diameter of the reverse carrier cup.

Figure 3:
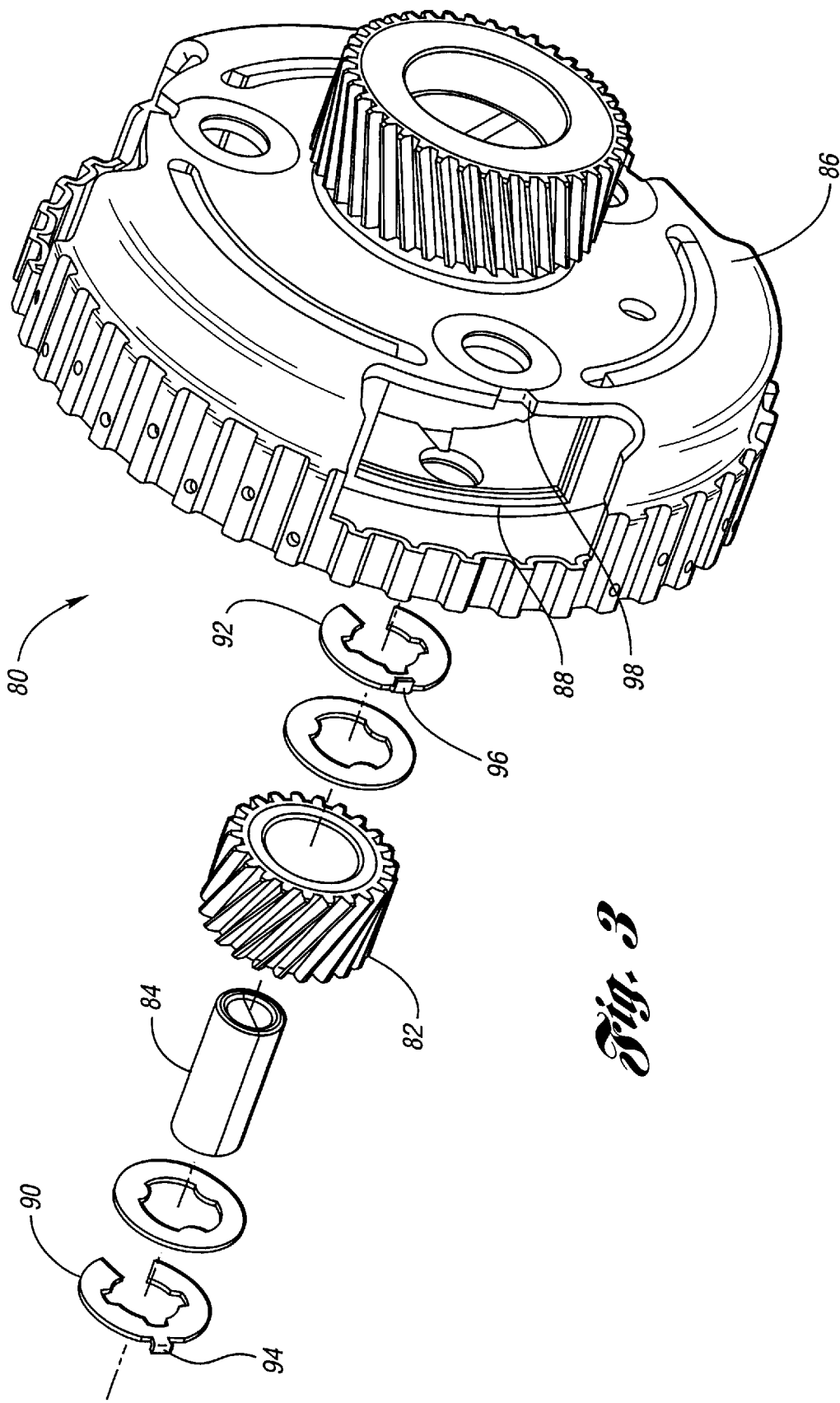
FIG. 3 is an exploded perspective view of a reaction carrier assembly.

FIG. 3 shows a reaction carrier assembly 80 for the transmission. The reaction carrier assembly 80 includes a plurality of circumferentially spaced planetary gears 82 mounted about needle-bearinged shafts 84 extending between an externally-driven reaction carrier plate 86 and a reaction carrier clutch member 88. Thrust washers 90 and 92 are disposed on either side of each planetary gear 82. The thrust washers 90 engage the smaller outside diameter reaction carrier clutch member 88, and include at least one downturned anti-rotation tab 94 proximate their circumference. The thrust washers 92 engage the relatively larger outside diameter reaction carrier plate 86, and similarly include at least one downturned anti-rotation tab 96 along their circumference. The tab 96 of each thrust washer 92 keys into a slot 98 that extends radially inwardly from the circumference of the reaction carrier plate 86, preferably to a depth that generally matches the outside diameter of the reverse carrier clutch member 88. The inlets to the slots 98 in the reaction carrier plate 86 is preferably tapered, but may be rounded, to facilitate the automated installation of the thrust washers 92. The tab 94 of each thrust washer 90 is adapted to be positioned into a pocket or scallop (not shown) formed in the outside diameter of the reaction carrier clutch member 88, but may more preferably be situated against the outside diameter of the reaction carrier clutch member.

The present invention thus provides larger diameter, externally-driven carrier plates that incorporate slots or channels with optional through holes to aid in the automated thrust washer assembly process. The tapered inlets to the slots or channels further aid the automated assembly process. Finally, the present invention makes possible the use of common thrust washers on each side of the pinion gear.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A carrier assembly for an automatic transmission, the carrier assembly comprising:

a cup having a first outside diameter;
a plate connected to the cup, the plate having a second outside diameter greater than the first outside diameter and a channel extending inwardly from a circumference of the plate, the channel further extending axially through the plate to form a slot; and
a thrust washer having a tab keyed into the channel.

2. The carrier assembly of claim 1 wherein the plate is externally-driven.

3. The carrier assembly of claim 1 wherein the channel has a tapered inlet.

4. The carrier assembly of claim 1 wherein the channel has a rounded inlet.

5. The carrier assembly of claim 1 further comprising a second thrust washer engaged with the outside diameter of the cup.

6. A planetary gear carrier assembly for an automatic transmission, the planetary gear carrier assembly comprising:

a cup having a first outside diameter;
a plate connected to the cup, the plate having a second outside diameter greater than the first outside diameter and a channel extending inwardly from a circumference of the plate, the channel further extending axially through the plate to form a slot;

at least one planetary gear disposed between the cup and the plate; and a thrust washer disposed between the plate and the at least one planetary gear, the thrust washer having a tab keyed into the channel.

7. The planetary gear carrier assembly of claim 6 wherein the plate is externally-driven.

8. The planetary gear carrier assembly of claim 6 wherein the channel has a tapered inlet.

9. The planetary gear carrier assembly of claim 6 wherein the channel has a rounded inlet.

10. The planetary gear carrier assembly of claim 6 further comprising a second thrust washer engaged with the outside diameter of the cup.

11. An automatic transmission comprising:

a carrier including a cup and a plate connected to the cup, the plate having an outside diameter greater than an outside diameter of the cup, the plate having a channel extending inwardly from a circumference of the plate, the channel further extending axially through the plate to form a slot; and a thrust washer having a tab keyed into the channel.

12. The automatic transmission of claim 11 wherein the plate is externally-driven.

13. The automatic transmission of claim 11 wherein the channel has a tapered inlet.

14. The automatic transmission of claim 11 further comprising a second thrust washer engaged with the outside diameter of the cup.

* * * * *